United States Patent [19]
de Tassigny

[11] Patent Number: 4,764,305
[45] Date of Patent: Aug. 16, 1988

[54] PROCESS FOR THE CONDITIONING OF RADIOACTIVE OR TOXIC WASTE IN EPOXY RESINS AND POLYMERIZABLE MIXTURE WITH TWO LIQUID CONSTITUENTS USABLE IN THIS PROCESS

[75] Inventor: Christian de Tassigny, Sassenage, France

[73] Assignee: Commissariat a l'Energie Atomique, Paris, France

[21] Appl. No.: 827,278

[22] Filed: Jan. 29, 1986

[30] Foreign Application Priority Data

Feb. 14, 1985 [FR] France ................................ 85 02113

[51] Int. Cl.[4] .......................... G21F 9/16; C08F 8/32; C08L 95/00

[52] U.S. Cl. ................................ 252/628; 106/273 R; 106/284; 252/631; 252/633; 427/6; 427/221; 427/385.5; 427/386

[58] Field of Search ............... 252/628, 631, 633, 478; 405/128, 129; 250/506.1, 507.1; 427/5, 6, 221, 222, 385.5, 386; 106/273 R, 277, 280, 284, 285, DIG. 7

[56] References Cited

U.S. PATENT DOCUMENTS

| | | | |
|---|---|---|---|
| 3,723,338 | 3/1973 | Godfrey | 252/628 |
| 4,077,901 | 3/1978 | Arnold et al. | 252/628 |
| 4,122,048 | 10/1978 | Buchwalder et al. | 252/628 |
| 4,131,563 | 12/1978 | Bahr et al. | 252/628 |
| 4,222,889 | 9/1980 | Verpmann | 252/628 |
| 4,230,660 | 10/1980 | Taylor et al. | 252/478 |
| 4,297,827 | 11/1981 | Allison | 252/628 |
| 4,299,721 | 11/1981 | Hirano et al. | 252/628 |
| 4,405,512 | 9/1983 | Filter et al. | 252/628 |
| 4,599,196 | 7/1986 | de Tassigny | 252/628 |

FOREIGN PATENT DOCUMENTS

| | | | |
|---|---|---|---|
| 1071246 | 12/1959 | Fed. Rep. of Germany . | |
| 2449406 | 4/1976 | Fed. Rep. of Germany . | |
| 2174272 | 10/1973 | France . | |
| 2361725 | 3/1978 | France . | |
| 2544909 | 10/1984 | France | 252/628 |

*Primary Examiner*—John F. Terapane
*Assistant Examiner*—Howard J. Locker
*Attorney, Agent, or Firm*—James E. Nilles

[57] ABSTRACT

The invention relates to a process for the conditioning of radioactive or toxic waste in epoxy resins and a polymerizable mixture with two liquid constituents usable in this process.

This process consists of incorporating the waste into a polymerizable mixture incorporating at least one epoxy resin, pitch and at least one epoxy resin hardener and allowing the thus obtained mixture to harden.

Generally the mixture comprises at least 50% by weight pitch and can be used for treating radioactive waste constituted by large objects and organic liquids.

15 Claims, 1 Drawing Sheet

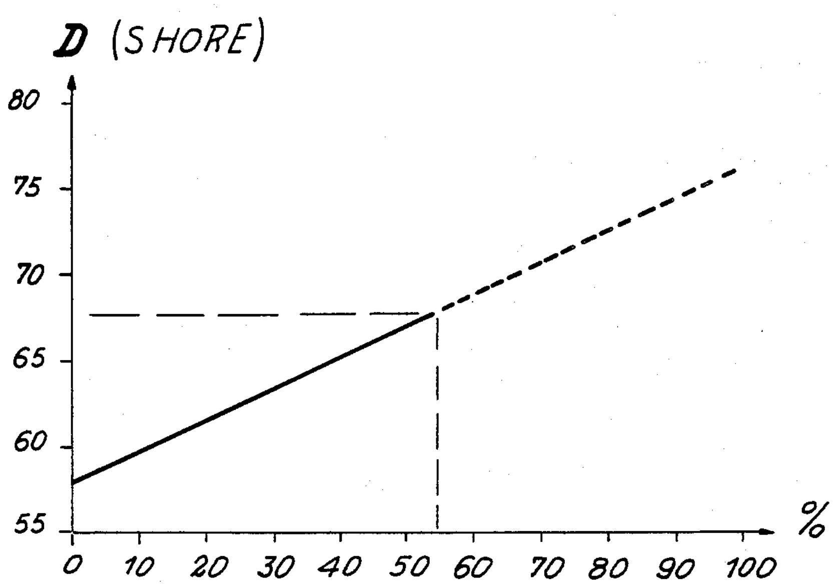
D (SHORE)
80
75
70
65
60
55
0
10
20
30
40
50
60
70
80
90
100
%

PROCESS FOR THE CONDITIONING OF RADIOACTIVE OR TOXIC WASTE IN EPOXY RESINS AND POLYMERIZABLE MIXTURE WITH TWO LIQUID CONSTITUENTS USABLE IN THIS PROCESS

BACKGROUND OF THE INVENTION

The present invention relates to a process for conditioning radioactive or toxic waste in epoxy resins.

Over the past few years processes have been developed for the conditioning of radioactive or toxic waste in thermosetting resins consisting of introducing the waste into a polymerizable mixture, e.g. constituted by an epoxy resin and a hardener and then allowing the resin to polymerize to obtain a solid block within which are confined the radioactive or toxic wastes.

More specifically, the present invention relates to polymerizable mixtures of this type based on epoxy resins, more particularly usable for the treatment of certain waste materials, such as large solid waste and organic liquids.

Thus, the conditioning of large solid radioactive waste materials causes problems due to the phenomenon of the epoxy resin shrinking during hardening. These problems have hitherto been solved by adding an inert filler, such as e.g. sand to the polymerizable mixture and as described in French patent No. 2 361 725. However, this has led to difficulties in performing the process.

In the case of contaminated organic liquids, it is possible to condition these in thermosetting resins, as described in French Pat. No. 2 230 041, but the treatment of such liquids leads to problems relating to obtaining a homogeneous mixture.

SUMMARY OF THE INVENTION

The present invention relates to a polymerizable mixture of an epoxy resin and a hardener, which also contains a special additive making it possible to solve the problems resulting from the conditioning of waste constituted by large size objects or organic liquids.

The inventive toxic or radioactive waste conditioning process is characterized in that it comprises incorporating said waste into a polymerizable mixture containing at least one epoxy resin, pitch and at least one hardener for the epoxy resin and allowing the mixture to harden to obtain a solid block.

According to a preferred embodiment, the mixture consists of 30 to 45% by weight epoxy resin, 30 to 50% by weight pitch and 20 to 25% by weight hardener. Generally the mixture contains at the most 50% by weight pitch.

The addition of pitch to polymerizable mixtures based on epoxy resin used in the prior art in particular makes it possible to increase the fluidity of the polymerizable composition, which makes the same more suitable for the coating of large solid waste, such as filter cartridges, tools, metal filings placed in a basket and the like. The presence of pitch also makes it possible to improve the compatibility of the epoxy resins with organic liquids, such as drainage oils, distillation residues, scintillation liquids and solvents such as tributyl phosphate or xylene, which are generally immiscible with thermosetting resins.

Thus, the polymerizable mixture according to the invention is of considerable interest for the treatment of large solid waste and organic liquids. Moreover, in view of the fact that the presence of pitch is not prejudicial to the quality of the finally obtained solid block, the polymerizable mixtures according to the invention can be used for conditioning other waste, which makes it possible to reduce the treatment or conditioning costs, because the price of the pitch is lower than that of the epoxy resins.

The pitches used in the invention can be those obtained from the distillation of carbonization tars, particularly tars having a low content of insoluble products. These pitches must be compatible with the epoxy resin and hardener used and are also chosen as a function of the type of waste treated.

For example, it is possible to use the pitch marketed under reference 730/30, which is a liquid coal pitch without volatile fractions and obtained from the treatment of tars having low insoluble product contents.

This tar has the following characteristics:

water content : traces
density at +20° C. : 1.184
viscosity at 30° C. : 30 poises
fractional distillation:
fraction before 200° C. : <0.5%
fraction from 200° to 250° C. : 6%
fraction from 250° to 300° C. : 18%
fraction from 300° to 350° C. : 16%
distillation residue : 60%
insoluble in benzene : 10%.

It is also possible to use the pitch marketed under reference 710/25 and which differs from pitch 730/30 by its viscosity of 25 poises and different distillation fractions.

These pitches are compatible with epoxy resins in substantially all proportions. They are inexpensive and when added to epoxy resins in a quantity of no more than 50% by weight of the polymerizable mixture, it is possible to maintain the interesting characteristics of the epoxy resins, such as infusibility, high mechanical properties and long life. These pitch—epoxy resin mixtures can also harden at ambient temperature, in the same way as the polymerizable mixture based on epoxy resin. The viscosity of the epoxy resin—pitch mixtures is lower than that of mixtures of epoxy resin and sand used in the prior art for the treatment of large solid radioactive waste. Thus, such waste can be conditioned under better conditions, particularly as regards the preparation and transfer of the coating mixture.

During the hardening of such mixtures, chemical bonds are established between the pitch and the epoxy reagents. Thus, this participation of the pitch in the polymerization gives the matrix a higher stability than in the case where use is made of mixtures of epoxy resin and sand, optionally also containing solvents and/or plasticizers.

The addition of pitch to the polymerizable epoxy resin mixture gives the resin a thermoplastic character, which increases with the pitch content of the mixture. Thus, the hardness of the mixture decreases when the pitch content increases. In the same way the hardness of the mixture decreases when the temperature increases and this effect increases with the pitch content of the mixture. Moreover, to maintain adequate hardness characteristics in the solid blocks obtained, namely a Shore hardness of at least 50D, it is preferable for the added pitch quantity to represent no more than 40% by weight of the polymerizable mixture. Thus, due to the chemical interactions between the pitch and the epoxy resin, a pitch proportion, e.g. up to 30% by weight in the mixture has no influence on the hardness. However, above a 30% by weight proportion, the hardness rapidly decreases, because the excess pitch acts as an inert plasticizer. In certain cases, the pitch can also act as a solvent, particularly with respect to certain liquid waste materials which can only be incorporated with difficulty into the epoxy resins.

Generally for putting into effect the process according to the invention, use is made of a first liquid constituent consisting of pitch and hardener, as well as a second liquid constituent based on the epoxy resin. The two liquid constituents are mixed with the liquid waste, so as to obtain a homogeneous mixture. The mixture is then allowed to harden to obtain a solid block. In the case of solid waste, the mixture is poured into the container and its low viscosity makes it possible to penetrate the interstices of the solid waste.

It is possible to perform these operations at ambient temperature, as in the case of polymerizable mixtures based on epoxy resin and hardener of the prior art. Thus, the reaction is exothermic and the evolution of the temperature in the reaction medium is the same as that obtained when using mixtures containing solely an epoxy resin and a hardener. In order to obtain a 200ℓ block, a maximum temperature of approximately 100° C. is obtained in 7h when the mixture contains 40% by weight of pitch. However, the presence of the pitch considerably slows down the final crosslinking of the epoxy resins and three weeks to a month may be necessary to obtain the desired hardness.

However, it is possible to activate this phenomenon by carrying out the hardening of the mixture at an initial temperature exceeding 20° C. Nevertheless, for a given volume, the maximum temperature must not exceed the boiling temperatures of the constituents. For putting into effect the process according to the invention, it is also possible to directly mix the pitch, the epoxy resin and the hardener with the waste to be treated at the time of use, whilst then leaving the mixture to harden so as to obtain a solid block. In the latter case, the hardening can be carried out at a temperature of 20° to 60° C.

It is preferable not to mix the pitch and epoxy resin beforehand, because these can react and lead to an increase of the viscosity during the storage of the mixture due to slow polymerization. However, it is possible to add the pitch to the hardener beforehand, so that at the time of coating the waste there is a mixture of two liquid constituents, which facilitates the actual coating process.

Thus, the invention also relates to a polymerizable mixture with two liquid constituents usable for the conditioning of toxic or radioactive waste comprising a first liquid constituent incorporating at least one epoxy resin and a second liquid constituent incorporating a mixture of pitch and at least one hardener of the epoxy resin, the pitch proportion in the second liquid constituent being 53 to 73% by weight. It is preferably fixed at 64% by weight, which corresponds to a polymerizable mixture containing 40% by weight pitch.

The use of such a mixture with two liquid constituents is particularly advantageous for the treatment of radioactive waste constituted by large objects, because it is easier to use than the mixture of three constituents based on resin, sand and hardener used in the prior art, which had to be prepared in a continuous mixer at the time of the coating operation.

When using the mixture of two liquid constituents according to the invention, a static mixer can be used, i.e. a simpler and less complicated device.

Generally, the pitch is introduced into the polymerizable mixture or into the second liquid constituent in the form of a solution in an appropriate solvent. Thus, pitch is a solid compound and for introducing it in the form of a liquid constituent, a preferably slightly volatile solvent is added thereto, such as chrysanthemum or anthracene oil and the viscosity of the solution is adjusted by regulating the added solvent quantity.

The epoxy resins used in the polymerizable mixture according to the invention can e.g. be bis-phenol A diglycidyl ethers and their viscosity can be regulated by adding a diluent reactive at low vapour tension, such as neopentyl diglycidyl ether.

The hardeners used with the resins of this type can be constituted by compounds having at least one $NH_2$ group, e.g. by cycloaliphatic or aromatic amines, aromatic or cycloaliphatic polyamines and derivatives of propylene amine. It is also possible to use polyamino amides.

Preferably compounds are chosen having a mixture of cycloaliphatic and aromatic amines, which permits polymerization of the resin to take place at any pH.

The hardener can be constitued by a compound of this type in the pure state or dissolved in an appropriate diluent, such as benzyl alcohol. Generally preference is given to the use of hardeners constituted by adducts, which are the product of the reaction of a small amount of epoxy resin with the compound having at least one $NH_2$ group, to which is optionally added a cycloaliphatic polyamine, a non-reactive diluent and/or a hardening accelerator.

The non-reactive diluent can be benzyl alcohol and the hardening accelerator the product of the reaction of acrylic acid benzoic acid, salicylic acid or a phenol, such as resorcinol with diaminodiphenyl methane. Preferably, the hardener is an adduct of diaminodiphenyl methane and epoxy resin, which may optionally also contain a cycloaliphatic polyamine.

The hardener quantity present in the polymerizable mixture for obtaining the polymerization and crosslinking of the epoxy resin is dependent on the epoxy resin used and in particular its epoxy equivalent, i.e. the resin mass containing an epoxy function. In general, to obtain the hardening and crosslinking of the eopxy resin, use is made of a hardener quantity such that there is at least one $NH_2$ amine function per epoxy resin equivalent, the hardener quantity being such that the hardener:epoxy resin weight ratio exceeds 0.5 and is e.g. equal to 0.6. The hardener—epoxy resin mixture described hereinbefore must have a low exothermicity in order to permit mass polymerization, so that in all cases the maximum temperature remains below the boiling temperature of the constituents, e.g. 90° C. for a 200 liter barrel.

The waste which can be conditioned by the process of the invention can be in various forms. Thus, they can be constituted by solid waste, such as powders of evaporation concentrates, liquid effluents, pulverulent products, ash from the incineration of fuel waste and large objects such as filter cartridges, tools or metal filings in a basket. The process according to the invention can also be used for treating organic liquid waste, such as aliphatic or aromatic hydrocarbons, chlorinated solvents, extraction solvents such as tributyl phosphate and trilauryl amine, drainage oils and scintillation liquids used for beta counting.

However, in view of the hydrophobic nature of pitch, it is difficult to use the process of the invention for treating waste having a high water content and aqueous liquid waste. However, filter cartridges having a 100% water content can be treated by the inventive process, because this essentially corresponds to the water saturation of the filters.

The quantity of waste incorporated into the polymerizable mixture according to the invention is of the same order as that which can be incorporated in the prior art polymerizable mixtures. In the case of most waste, the incorporated quantity can represent 40 to 60% of the total formed by the waste and the polymerizable mixture. However, in the case of certain liquid waste, it is necessary not to exceed certain contents, because otherwise there can be a decanting of the liquids during the mixing operation and/or a sweating phenomenon during the polymerization operation. Moreover, the quantities which can be incorporated also depend on the pitch content of the mixture and the nature of the epoxy resin, the hardener and the pitch used in the polymerizable mixture.

According to a variant of the process according to the invention, around the solid block constituted by the waste incorporated into the hardened mixture of epoxy resin, pitch and hardener is formed a protective barrier produced from a polymerizable mixture containing at least one epoxy resin, pitch and at least one epoxy resin hardener. This makes it possible to form a barrier with respect to the diffusion of active or toxic elements, particularly when the solid waste is close to the walls of the hardened block. Furthermore, this barrier is very effective with respect to the diffusion of tritium and tritium-added water.

In this variant, it is possible to firstly form a hardened block by incorporating the waste into the polymerizable mixture, followed by the inclusion of this hardened block in a hollow cylindrical barrel produced from a polymerizable mixture incorporating an epoxy resin, pitch and a hardener.

In this case, the waste and the polymerizable mixture incorporating at least one epoxy resin, pitch and at least one hardener for the epoxy resin are introduced into a cylindrical barrel obtained by hardening a polymerizable mixture incorporating at least one epoxy resin, the pitch and at least one epoxy resin hardener and said polymerizable mixture is allowed to harden to obtain a solid block within said barrel. The latter can be prepared by conventional methods, e.g. by casting in a mould, within which is placed an inner core, or alternatively by centrifuging.

This protective barrier can also be formed during the conditioning of radioactive or toxic waste by placing the solid waste in a basket, such as a metal basket located in a barrel, so as to provide an adequate thickness between the basket and the barrel. In this case, the waste is firstly introduced into a basket, the basket containing the waste is placed in a barrel so as to leave a space between the inner barrel wall and the outer basket wall, the barrel and basket are filled with the polymerizable mixture containing at least one epoxy resin, pitch and at least one epoxy resin hardener and said mixture is allowed to harden to obtain in said barrel a solid block incorporating an outer layer formed solely from the polymerizable mixture based on epoxy resin, pitch and hardener.

Thus, on introducing the polymerizable fluid mixture into the basket, this passes through the perforations of the basket so as to fill the space between the barrel and the basket and then form by hardening the outer layer constituting the protective barrier.

DESCRIPTION OF THE DRAWING AND THE NON-LIMITATIVE EXAMPLES

Other features and advantages of the invention can be gathered from reading the following examples given in a non-limitative manner for illustrating the invention and with reference to the attached drawing, which is a graph showing the Shore D hardness of solid blocks obtained according to the invention and as a function of their waste content.

In all the examples, use is made of a polymerizable mixture incorporating:

an epoxy resin constituted by a bis-phenol A diglycidyl ether with an epoxy equivalent of approximately 190 diluted by neopentyl diglycidyl ether and marketed by CDF Chimie under the reference MN 201 T, a hardener constituted by the products sold under reference D6M5 by CDF Chimie and which consists of a cycloaliphatic polyamine having an amine equivalent of approximately 63 and an adduct of diaminodiphenyl methane and epoxy resin having an amine equivalent of approximately 130 and a pitch solution marketed under reference 730/30 by Desailly.

EXAMPLE 1

This example illustrates the coating of solid waste constituted by metal filings and tools placed in a metal basket. 20% by volume of said waste is introduced into a 200ι container. 80% by volume of a mixture (40% pitch, 20% hardener and 40% resin) are then added and line the gaps left between the waste. The block obtained has a Shore D hardness of 54.

EXAMPLE 2

This example illustrates the conditioning of a drainage oil constituted by an industrial lubricating oil. In this example, into a 200 liter barrel is introduced a mixture of pitch and hardener D6M5, epoxy resin MN 201 T and drainage oil in the following proportions:

10% by weight drainage oil,
30% by weight pitch,
22.5% by weight hardener,
37.5% by weight epoxy resin.

The mixture is then allowed to harden at 20° C. for 15 days and the Shore hardness of the block is determined and is approximately 67D.

Tests performed by replacing part of the drainage oil by pitch and retaining the same resin and hardener proportions have revealed that the Shore hardness decreases with the oil content. These results are illustrated in the attached graph representing the Shore hardness as a function of the oil percentage of the oil—pitch mixture. Moreover, it has been found that on increasing the oil content of the oil—pitch mixture to above 50%, there is a decanting or settling of the oil, which does not make it possible to obtain a homogeneous block.

EXAMPLE 3

This example illustrates the conditioning of waste constituted by tributyl phosphate. In this example, mixing takes place of the tributyl phosphate (TBP), pitch, hardener and epoxy resin in the following proportions:

4% by weight TBP,
36% by weight pitch, 22.5% by weight hardener, 37.5% by weight epoxy resin.

After the mixing operation, hardening is allowed to take place at 20° C. and the Shore hardness of the blocks obtained is measured after 15 days hardening and is approximately 52D.

EXAMPLE 4

This example illustrates the conditioning of a scintillation liquid used for beta counting and constituted by 99.5% by weight solvent, mainly xylene and 0.5% by weight linked with scintillator. In this example, the scintillation liquid, pitch, hardener and epoxy resin are mixed in the following proportions:

4.8% by weight scintillation liquid, 35.2% by weight pitch, 22.5% by weight hardener, 37.5% by weight epoxy resin.

As hereinbefore, the Shore hardness of the blocks obtained is measured after 15 days hardening at 20° C. and exceeds 50D.

I claim:

1. A process for the conditioning of radioactive or toxic waste, which comprises incorporating said waste into a polymerizable mixture consisting essentially of 30 to 45% by wt. epoxy resin, 30 to 50% by wt. pitch and 20 to 25% epoxy resin hardener, and allowing the mixture to harden to obtain a solid block, said polymerizable mixture being filler-free and miscible with organic liquids.

2. A process according to claim 1, wherein the mixture comprises between 30 and 40% by weight pitch.

3. A process according to claim 1, wherein the pitch is a coal pitch obtained from treatment of tars having a low content of insoluble products.

4. A process according to claim 1, wherein use is made of a first liquid constituent comprising pitch and hardener and a second liquid constituent based on epoxy resin, wherein the two liquid constituents are mixed with the waste so as to obtain a homogeneous mixture and wherein the mixture is then allowed to harden to obtain a solid block.

5. A process according to claim 4, wherein the mixture is hardened at between 20° and 60° C.

6. A process according to claim 1, wherein the waste is constituted by large objects.

7. A process according to claim 1, wherein the waste is constituted by organic liquids.

8. A process according to claim 7, wherein the organic liquids are chosen from among drainage oils, organic solvents and scintillation liquids.

9. A process according to claim 1, wherein around the solid block is formed a protective barrier produced from a polymerizable mixture incorporating at least one epoxy resin, pitch and at least one epoxy resin hardener.

10. A process according to claim 1, wherein the waste and the polymerizable mixture incorporating at least one epoxy resin, pitch and at least one epoxy resin hardener are introduced into a cylindrical barrel obtained by hardening a polymerizable mixture incorporating at least one epoxy resin, pitch and at least one epoxy resin hardener and wherein said polymerizable mixture is allowed to harden to obtain a solid block within the barrel.

11. A process according to claim 1, wherein the waste is introduced into a basket, the basket containing the waste is placed in a barrel so as to leave a space between the inner barrel wall and the outer basket wall and the barrel and basket are filled with the polymerizable mixture incorporating at least one epoxy resin, pitch and at least one epoxy resin hardener, the mixture being hardened to obtain in said barrel a solid block having an outer layer formed solely from the polymerized mixture based on epoxy resin, pitch and hardener.

12. A filler-free polymerizable mixture with two constituents for the conditioning of radioactive or toxic waste, which consisting essentially of a first liquid constituent incorporating at least one epoxy resin and a second liquid constituent incorporating a mixture of pitch and at least one epoxy resin hardener, the pitch proportion in the second liquid constituent being 53 to 73% by wt., said mixture being miscible with organic liquids.

13. A mixture according to claim 12, wherein the epoxy resin is a bis-phenol A diglycidyl ether, to which is added a reactive diluent.

14. A mixture according to claim 12, wherein the hardener is an adduct of diaminodiphenyl methane and epoxy resin.

15. A mixture according to claim 12, wherein the hardener comprises a cycloaliphatic polyamine and an adduct of diaminodiphenyl methane and epoxy resin.

* * * * *